(12) United States Patent
Suzuki et al.

(10) Patent No.: US 8,586,182 B2
(45) Date of Patent: Nov. 19, 2013

(54) COMPOSITE PARTICLE FOR ELECTRODE AND ELECTROCHEMICAL DEVICE

(75) Inventors: Tadashi Suzuki, Tokyo (JP); Hisashi Suzuki, Tokyo (JP); Masato Kurihara, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/236,602

(22) Filed: Sep. 24, 2008

(65) Prior Publication Data

US 2009/0087660 A1 Apr. 2, 2009

(30) Foreign Application Priority Data

Sep. 28, 2007 (JP) ................................. P2007-255141

(51) Int. Cl.
*B32B 33/00* (2006.01)

(52) U.S. Cl.
USPC ........... 428/403; 428/402; 428/407; 429/488; 429/528

(58) Field of Classification Search
USPC .................................. 428/402, 403; 523/200
See application file for complete search history.

(56) References Cited

U.S. PATENT DOCUMENTS

| | | | |
|---|---|---|---|
| 6,440,610 B1 * | 8/2002 | Sheem et al. | 429/231.8 |
| 6,482,547 B1 * | 11/2002 | Yoon et al. | 429/231.8 |
| 7,368,202 B2 * | 5/2008 | Kurihara et al. | 429/209 |
| 2005/0064289 A1 * | 3/2005 | Suzuki et al. | 429/209 |
| 2006/0060827 A1 * | 3/2006 | Ravet et al. | 204/293 |
| 2007/0031732 A1 | 2/2007 | Chiang et al. | |
| 2007/0059598 A1 | 3/2007 | Yang | |
| 2008/0160409 A1 * | 7/2008 | Ishida et al. | 429/220 |
| 2008/0268342 A1 | 10/2008 | Suzuki et al. | |

FOREIGN PATENT DOCUMENTS

| | | |
|---|---|---|
| CN | 1416189 A | 5/2003 |
| CN | 1834004 A | 9/2006 |
| CN | 1891668 A | 1/2007 |
| CN | 101295786 A | 10/2008 |
| JP | A-10-162825 | 6/1998 |
| JP | A-2003-157850 | 5/2003 |
| JP | A-2003-292308 | 10/2003 |
| JP | A-2003-308845 | 10/2003 |
| JP | A-2006-066081 | 3/2006 |
| WO | WO 2006022254 * | 3/2006 |

OTHER PUBLICATIONS

Machine Translation and Abstract of JP 2004-303527, Ishihara, Oct. 2004.*
Azmi et al., LIVOPO4 as a new cathode materials for Li-ion rechargeable battery, Jun. 2005.*
English Translation of Umeno et al., JP 2006-302671, Nov. 2006.*

(Continued)

*Primary Examiner* — Callie Shosho
*Assistant Examiner* — Ronak Patel
(74) *Attorney, Agent, or Firm* — Oliff & Berridge, PLC (57) ABSTRACT

A composite particle for electrode as an active material capable of forming an electrochemical device with excellent discharge capacities and rate characteristics is provided. A composite particle for electrode according to the present invention comprises a particulate core including at least one mother particle containing an electrode active material, and an electron-conducting layer which covers at least part of the surface of the particulate core, the electron-conducting layer including carbon and microparticles containing an electrode active material, and the microparticles having a particle size of 300 nm or less.

8 Claims, 8 Drawing Sheets

(56) References Cited

OTHER PUBLICATIONS

Chung et al., Sung-Yoon, "Electronically Conductive Phospho-Olivines as Lithium Storage Electrodes," Nature Materials, vol. 1, Oct. 2002, pp. 123-128.

Search Report dispatched Dec. 19, 2011 in counterpart European Patent Application No. 08017010.3.
Office Action issued Sep. 12, 2012 in European Patent Application No. 08 017 010.3-1227.

* cited by examiner

Fig.8

COMPOSITE PARTICLE FOR ELECTRODE AND ELECTROCHEMICAL DEVICE

BACKGROUND OF THE INVENTION

1. Field of the Invention

The present invention relates to composite particles for electrodes and electrochemical devices.

2. Related Background Art

Lithium-ion secondary batteries with improved discharge capacities and rate characteristics requires enhanced ion diffusion capabilities of active materials used for electrodes of the secondary batteries, increased contact areas between the active materials and electrolytic solutions, or enhanced electron conductivities of active materials. Methods for enhancing the ion diffusion capability of the active material and increasing the contact area between the active material and the electrolytic solution include reduction in particle size of the active material. Methods for imparting electron conductivity to the active material include compounding of the active material with an electron-conducting material such as carbon.

Such a composite of the active material and carbon includes a carbonaceous composite of lithium-iron-phosphorous-based complex oxide, which is composed of particulate $LiFePO_4$ coated with the conductive carbonaceous material, the particulate $LiFePO_4$ being made from ferrous phosphate octahydrate $(Fe_3(PO_4)_2 \cdot 8H_2O)$ and lithium phosphate $(Li_3PO_4)$, the carbonaceous composite being characterized by having an average particle size of 0.5 μm or less, as is disclosed in Japanese Patent Application Laid-open No. 2003-292308, for example.

SUMMARY OF THE INVENTION

Due to its fine structure, however, such a composite of the active material with carbon as described in Japanese Patent Application Laid-open No. 2003-292308 hardly provides electrodes with higher capacities. In addition, further reduction in particle size of the active material and its composite for further enhancing ion diffusion capability of the active material and increasing the contact area between the active material and the electrolytic solution makes difficult to treat a large volume of fine particles in preparing a coating material containing the composite for electrode production.

Traditionally, mixing fine particles of 1 μm or less in particle size composed of an active material, or this fine particle and an active material of about 1 μm to about 20 μm in particle size with carbon to compound the active material with carbon has made it difficult to contact the active material with the conductive material, which leads to a potential reduction in electroconductivity of the composite. An attempt to compound a mother particle with multiple fine particles by coating the surface of the mother particle requires a great amount of binder for bonding the mother particle to the fine particles and mutual bonding between the fine particles. The use of a great amount of binder tends to reduce the electroconductivity of the composite particle as a whole.

As described above, mere coating of the active material with carbon, reduction in particle size of the active material, or mixing the active material with carbon cannot provide lithium-ion secondary batteries with improved discharge capacities and rate characteristics.

The present invention has been made in consideration of the problems of the conventional technology, and an object thereof is to provide a composite particle for electrode as an active material capable of forming an electrochemical device with excellent discharge capacities and rate characteristics, and an electrochemical device using the composite particle for electrode.

In order to achieve the object, a composite particle for electrode according to the present invention comprises a particulate core including at least one mother particle containing an electrode active material, and an electron-conducting layer which covers at least part of the surface of the particulate core, the electron-conducting layer including carbon and microparticles containing an electrode active material, and the microparticles having a particle size of 300 nm or less.

An electrochemical device according to the present invention comprises an electrode including a composite particle for electrode having at least one mother particle containing an electrode active material, and an electron-conducting layer which covers at least part of the surface of the particulate core, the electron-conducting layer including microparticles containing an electrode active material, and carbon, and the microparticles having a particle size of 300 nm or less.

Not only the mother particle contained in the particulate core but also the microparticles contained in the electron-conducting layer acts as an active material. Therefore, even a composite particle for electrode comprising the mother particle with a conventional ion diffusion capability can have an enhanced ion diffusion capability as a whole, as compared to a conventional composite of an active material with carbon.

In addition, the carbonaceous electron-conducting layer coated on at least part of the surface of the particulate core including the mother particle enhances the electron conductivity of the composite particle for electrode as a whole.

Also, the microparticles having a particle size of 300 nm or less contained in the electron-conducting layer can enhance the discharge capacity particularly at high rates.

An electrochemical device including the composite particle for electrode as an active material in the electrode can have improved discharge capacities and rate characteristics.

For purposes of this invention, the particulate core preferably has a particle size of 10 μm or less. The particulate core having a particle size within the appropriate range can reduce the ion diffusion resistance.

For purposes of this invention, the electrode active material contained in the mother particle is preferably a lithium-containing phosphate or a lithium-containing silicate salt. Preferably, the electrode active material contained in the microparticles is also a lithium-containing phosphate or a lithium-containing silicate salt.

An electrochemical device including a composite particle in the electrode in which the electrode active material contained in the mother particle or microparticles is a lithium-containing phosphate or a lithium-containing silicate salt can have further improved discharge capacities and rate characteristics.

The present invention provides a composite particle for electrode as an active material capable of forming an electrochemical device with excellent discharge capacities and rate characteristics, and an electrochemical device including the composite particle for electrode.

DESCRIPTION OF THE PREFERRED EMBODIMENTS

In reference to the accompanying drawings, preferred embodiments of the present invention will now be described in detail. In the drawings, identical or equivalent parts are denoted by the same reference numerals, without redundant description. Unless otherwise stated, the horizontal and vertical positional relationship among modules is based on the relationship shown in these figures. Besides, the dimensional proportion is not limited to those proportions shown in these figures.

Figure 1:
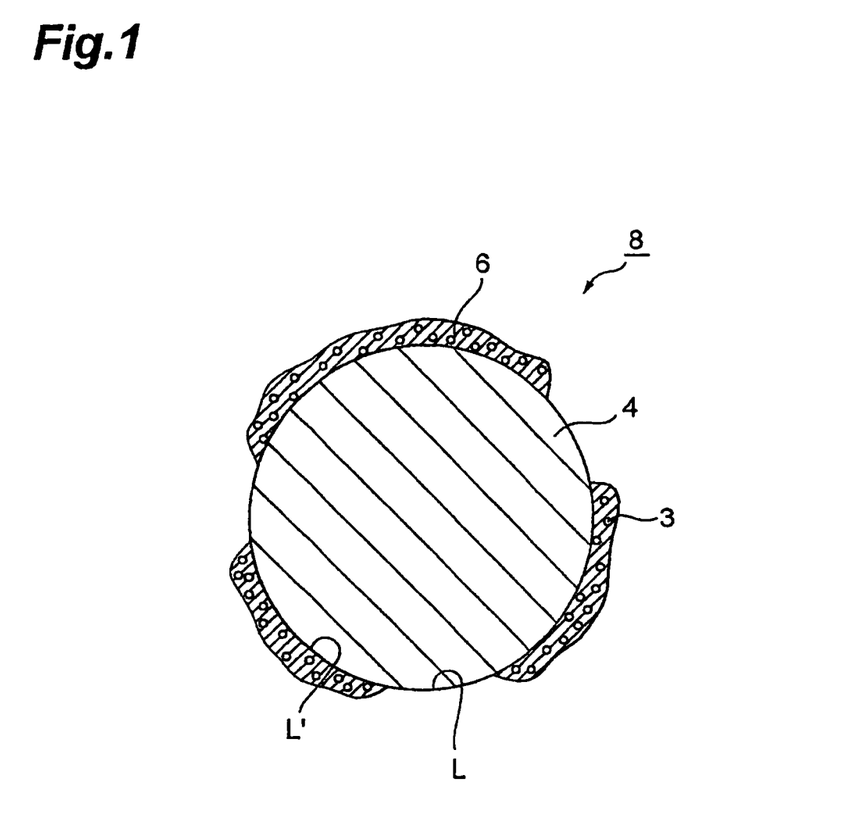
FIG. 1 is a schematic cross-sectional view that shows one example of a basic structure of a composite particle for electrode according to the present invention.

The composite particle for electrode of the present invention is first described. As shown in FIG. 1, a composite particle 8 for electrode comprises a particulate core 4 including at least one mother particle containing an electrode active material, and an electron-conducting layer 6 which covers at least part of the surface of a particulate core 4. As shown in FIG. 1, in this embodiment, the particulate core 4 is composed of one mother particle, although the core 4 may be composed of a secondary particle containing multiple mother particles. The electron-conducting layer 6 may cover the entire surface of the particulate core 4.

The particle size of the particulate core 4 is preferably 10 μm or less, and more preferably 4 μm or less. The particulate core 4 having a particle size within such an appropriate range can hold the balance between reduction in ion diffusion resistance and maintenance of the capacity density in an electrode.

The electron-conducting layer 6 includes microparticles 3 containing an electrode active material, and carbon. The average particle size of the microparticles 3 is 300 nm or less, and preferably from 1 nm to 100 nm.

Preferred examples of the electrode active material contained in the mother particle 4 include lithium-containing phosphate salts such as $LiFePO_4$, $LiMnPO_4$, and $LiVOPO_4$; lithium-containing silicate salts such as $Li_2FeSiO_4$ and $Li_2MnSiO_4$; and lithium-containing transition metal oxides such as $LiCoO_2$ and $LiNiMnCoO_2$. Among them, lithium-containing phosphate salts and lithium-containing silicate salts are more preferred. Preferred examples of the electrode active material contained in the microparticles 3 also include lithium-containing phosphate salts such as $LiFePO_4$, $LiMnPO_4$, and $LiVOPO_4$; lithium-containing silicate salts such as $Li_2FeSiO_4$ and $Li_2MnSiO_4$; and lithium-containing transition metal oxides such as $LiCoO_2$ and $LiNiMnCoO_2$. Among them, lithium-containing phosphate salts and lithium-containing silicate salts are more preferred.

The electrode active material contained in the mother particle 4 is preferably the same as that in the microparticles 3, but these active materials may be different from each other. The difference in lithium reference potential between the mother particle 4 and the microparticles 3 is preferably as small as possible, and particularly within a range of from −0.1 V to 0.1 V.

The composite particle 8 preferably has a coverage (L'/L) of 0.2 or more wherein L represents the length of the circumference of the particulate core 4, and L' represents the length of the electron-conducting layer 6 formed on the circumference of the particulate core 4 (expressed by the same unit as that of L) in the cross section shown in FIG. 1. When the electron-conducting layers 6 are formed in several locations in the cross section as shown in the composite particle 8 of FIG. 1, L' represents the total length of the electron-conducting layers 6 formed on the circumference of the particulate core 4.

The coverage is preferably 0.2 or more, more preferably 0.4 or more, further more preferably 0.5 or more, and most preferably from 0.6 to 1.0. When covered with the electron-conducting layer in a coverage of less than 0.2, the particulate core 4 is in an insufficient state of coverage as compared to in a coverage of 0.2 or more, which tends to reduce the electron conductivity of the composite particle 8 for electrode. An electrode with coverage of less than 0.2 is not significantly different from one in which carbon and active material are simply mixed and dispersed, and needs additional carbon. Thus, such an electrode cannot enhance characteristics in a minimal amount of carbon.

The composite particle 8 for electrode has preferably a BET specific surface area of from 1.5 $m^2$/g to 15.0 $m^2$/g, and more preferably from 2.0 $m^2$/g to 15.0 $m^2$/g. When a composite particle 8 for electrode has a BET specific surface area of less than 1.5 $m^2$/g, it tends to have an insufficient coverage with carbon. On the other hand, when a composite particle for electrode has a BET specific surface area of more than 15.0 $m^2$/g, a great amount of binder should be used in preparation of an electrode coating material containing the composite particle 8 for electrode. This reduces the proportion of the active material in the electrode and thus the capacity of the electrodes.

In the composite particle 8, the electron-conducting layer 6 preferably has an average thickness of from 10 nm to 500 nm, and more preferably from 20 nm to 300 nm. When the electron-conducting layer 6 has a thickness of less than 10 nm, the composite particle 8 for electrode tends to have insufficient electron conductivity. On the other hand, when the electron-conducting layer 6 has a thickness of more than 500 nm, an undue amount of carbon is contained in the composite particle 8 for electrode, thereby reducing the proportion of the active material to lead to reduction in electrode capacity.

The composite particle 8 for electrode preferably has a carbon content of from 0.5% to 20% by mass based on the total amount of the composite particle 8 for electrode, more preferably from 1.0% to 15% by mass, and especially preferably from 2.0% to 10% by mass. When a composite particle 8 for electrode has a carbon content of less than 0.5% by mass, it tends to have insufficient electron conductivity. On the other hand, when a composite particle 8 for electrode has a carbon content of more than 20% by mass, an undue amount of carbon is needed in the composite particle 8 for electrode, thereby reducing the proportion of the active material to lead to reduction in electrode capacity.

The composite particle 8 for electrode of the embodiment above can be manufactured by the methods below. Now, the methods for manufacturing the composite particle 8 for electrode including, but not limited to, a first and second methods below will be described.

The first method for manufacturing the composite particle 8 for electrode of the embodiment is to physically form an electron-conducting layer 6 on the surface of particulate LiVOPO$_4$, which is the particulate core 4 (the mother particle). That is, the first manufacturing method includes a fluidizing process that fluidizes the particulate LiVOPO$_4$, which is the particulate core 4, and particulate carbon fed in a fluidized bed in which an air stream is generated, thereby forming the electron-conducting layer 6 on at least part of the surface of the particulate core 4, In this fluidizing process, the particulate cores 4 with a kinetic energy collide with each other in the fluidized bed, or collide against the inner wall of the mixing vessel (fluidizing equipment) to form the microparticles 3. The particle size of the microparticles 3 is determined by the primary particle size of the particulate core 4, or the kinetic energy given to the particulate core 4.

The particulate core 4 can be obtained by mixing the Li, V, and PO$_4$ sources in stoichiometric ratios of LiVOPO$_4$, firing them at from 450° C. to 600° C. followed by pulverizing the product, for example. Examples of the Li source include Li$_2$CO$_3$, LiOH, or lithium acetate. Examples of the V source include V$_2$O$_5$ or NH$_4$VO$_3$. Examples of the PO$_4$ source include NH$_4$H$_2$PO$_4$ or (NH$_4$)$_2$HPO$_4$. The resulting particulate LiVOPO$_4$ has an orthorhombic crystal structure, which is more symmetric as compared to a triclinic crystal structure obtained at elevated temperatures, and therefore can achieve high capacities of Li ion intercalation and deintercalation.

Examples of particulate carbon include acetylene black, ketjen black, or graphite.

The ratio of the average particle size of the particulate core 4 to that of the particulate carbon is preferably from 10:1 to 100:1, and more preferably from 20:1 to 100:1. The ratio of the average particle size within the above range can allow the carbon, which is the child particle for the particulate core 4, to selectively cover the particulate core 4, thereby preventing the child particles from aggregating together.

The average particle size of the particulate core 4 is preferably 10 μm or less, and more preferably 4 μm or less. On the other hand, the average particle size of the particulate carbon is preferably from 10 nm to 200 nm, and more preferably from 10 nm to 150 nm. The average particle size of the microparticles 3 is 300 nm or less, and preferably from 1 nm to 100 nm.

In the fluidizing process, the particulate core 4 and the particulate carbon are mixed in a fluidized bed rotating at a high rate. This makes the particulate carbon collide with the particulate core 4 at high rates, a relatively soft particulate carbon covers the surface of the particulate core 4 while being deformed, and simultaneously the particulate cores 4 with a kinetic energy collide with each other or collide against the inner wall of the mixing vessel to form the microparticles 3. As a result, the surface of the particulate core 4 is covered with the electron-conducting layer 6, and the microparticles 3 are introduced to the electron-conducting layer 6. The fluidized bed is preferably rotated at from 1000 rpm to 20000 rpm.

The resulting electron-conducting layer 6 is barely exfoliated and has an appropriate thickness (for example, from 20 to 300 nm) as described above because the layer 6 is physically bonded strongly to the surface of the particulate core 4.

The second method for manufacturing the composite particle 8 for electrode of the present invention is to chemically form an electron-conducting layer 6 on the surface of particulate LiVOPO$_4$, which is the particulate core 4 (the mother particle). That is, the second manufacturing method includes a dispersing process of dissolving or dispersing the carbon source, and the Li, V, and PO$_4$ sources in a solvent to which the particulate core 4 is added to give a dispersion liquid of a LiVOPO$_4$-conductive layer precursor, and a heating process of heating the dispersion liquid.

The particulate core 4 can be obtained by the method explained in the first manufacturing method.

Examples of the carbon source include organic compounds that contain carbon and can dissolve in a solvent such as water, i.e., citric acid, maleic acid, fumaric acid, glucose, polysaccharides and oligosaccharides containing glucose as a constitutional unit, and carbonaceous materials such as acetylene black, ketjen black, or graphite.

Examples of usable solvents for dissolving or dispersing the carbon source include water or organic solvents. Among the organic solvents, ethanol is preferred.

In the dispersing process, the carbon source, and the Li, V, and PO$_4$ sources are dissolved or dispersed in a solvent to which the particulate core 4 is added and dispersed to give a dispersion liquid of a LiVOPO$_4$-conductive layer precursor.

In the heating process, the resultant dispersion liquid of the LiVOPO$_4$-conductive layer precursor is then heated. In this heating process, the dispersion liquid of the LiVOPO$_4$-conductive layer precursor is first heated to remove the solvent, thereby forming a LiVOPO$_4$/C precursor and then the precursor is further heated (calcined) in an atmosphere of Ar, H$_2$, or N$_2$ (at normal pressure), or reducing gas (at reduced pressure). This can allow carbon and microparticles 3 of LiVOPO$_4$ to be deposited on the surface of particulate LiVOPO$_4$, which is the particulate core 4, followed by formation of the electron-conducting layer 6. The precursor is preferably calcined at a temperature of from 400° C. to 600° C., and more preferably from 450° C. to 600° C.

The composite particle 8 for electrode obtained by the first or second manufacturing methods has preferably a carbon content of from 0.5% to 20% by mass based on the total amount of the composite particle, more preferably from 1.0% to 15% by mass, and especially preferably from 2.0% to 10% by mass. When the carbon content is less than 0.5% by mass, the electron-conducting layers 6 are present in a form of islands, which tends to reduce the conductivity. On the other hand, when the carbon content is more than 20% by mass, the electric capacity per mass of the composite particle 8 for electrode tends to decrease. The coverage of the electron-conducting layer 6 in the composite particle 8 for electrode is preferably formed such that the layer 6 covers the particulate core 4 in a form of a thin film rather than islands.

The composite particle 8 for electrode of the present invention can be also prepared by methods other than the first and second manufacturing methods. Examples of the methods for manufacturing the composite particle other than the first and second manufacturing methods include a method of adding the particulate core 4 and the microparticles 3 and particulate carbon into the dispersion media and mixing them in a ball mill.

The electrochemical device of the present invention will now be described. The electrochemical device of the present invention comprises an electrode containing the composite particle 8 for electrode of the embodiment. More specifically, the electrochemical device of the present invention comprises an anode, a cathode, and an electrolytic layer with ion conductivity, the anode being opposed to the cathode with the electrolytic layer interposed therebetween, wherein at least one of the anode and the cathode forms an electrode including the composite particle 8 for electrode of the present invention. As used herein, the term "anode" refers to a negative electrode based on the polarity of the electrochemical device at a charge cycle and the term "cathode" refers to a positive electrode based on the polarity of the electrochemical device at a discharge cycle.

Figure 2:
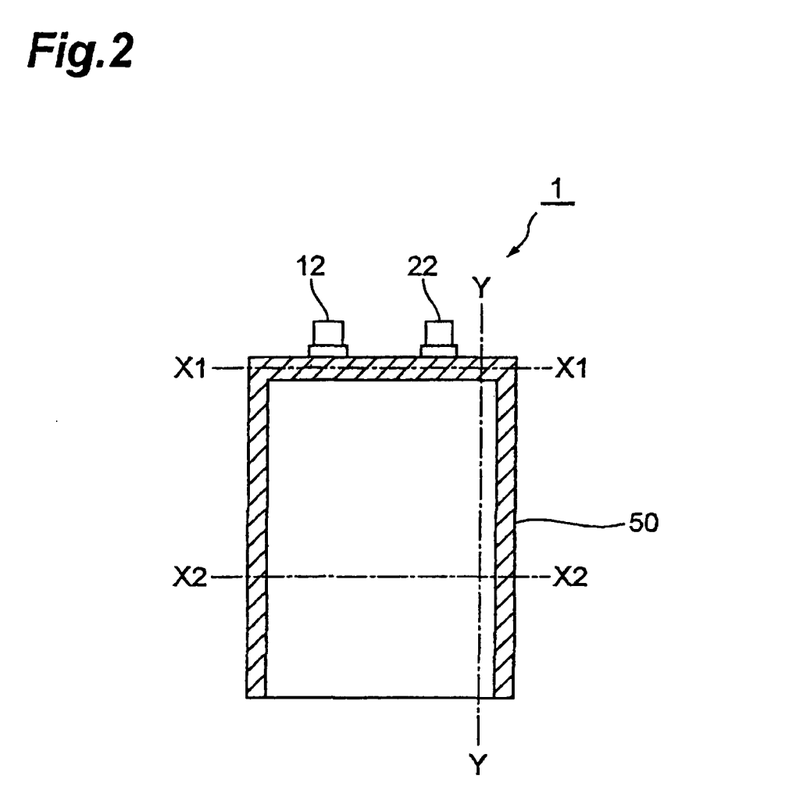
FIG. 2 is a front view that shows a preferred embodiment of an electrochemical device according to the present invention.
Figure 3:
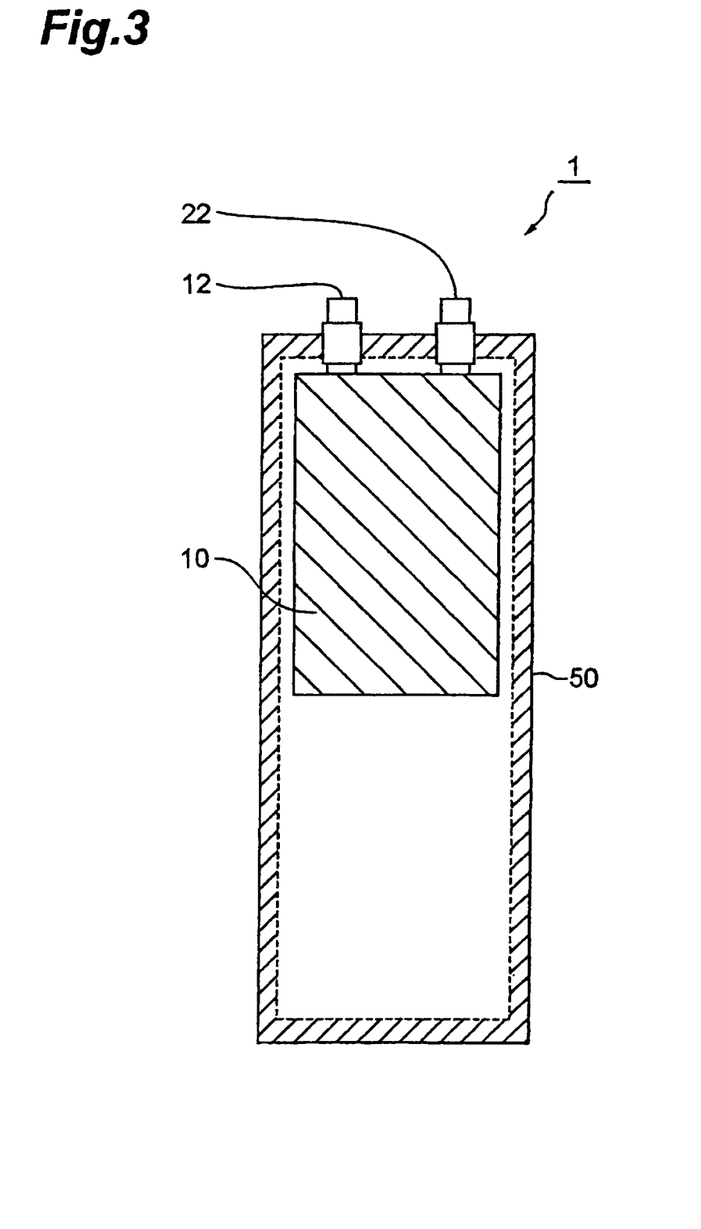
FIG. 3 is a developed view that shows the interior of the electrochemical device shown in FIG. 2 as seen from the normal direction of the surface of the negative electrode 10.
Figure 4:
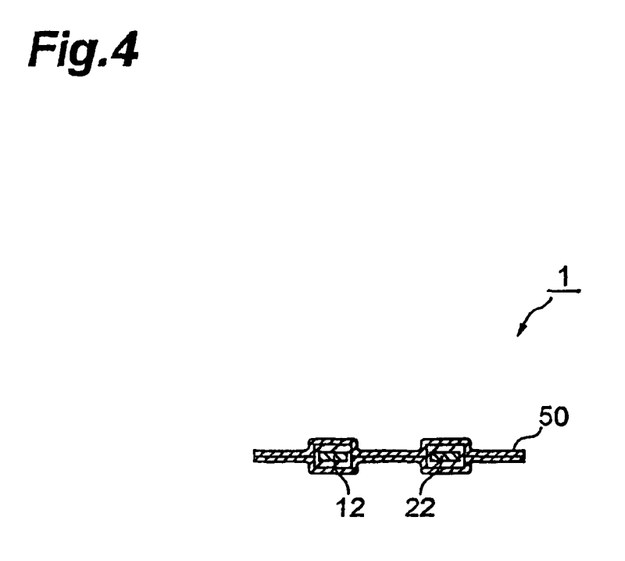
FIG. 4 is a schematic cross-sectional view that shows the electrochemical device shown in FIG. 2 taken along the line X1-X1 in FIG. 2.
Figure 5:
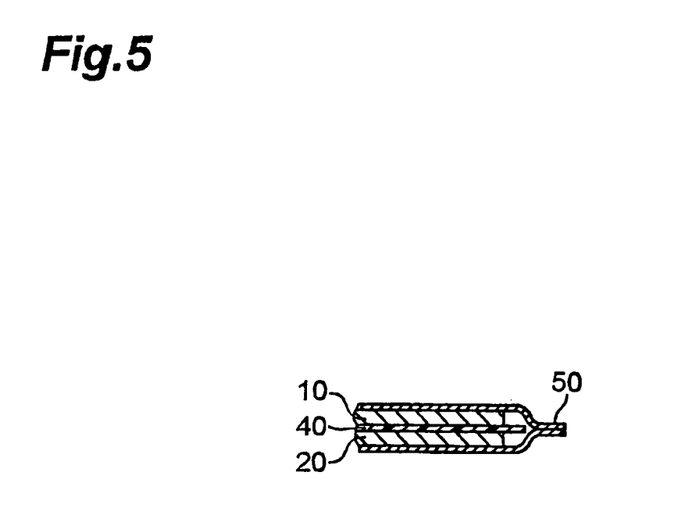
FIG. 5 is a schematic cross-sectional view that shows the principal part of the electrochemical device shown in FIG. 2 taken along the line X2-X2 in FIG. 2.
Figure 6:
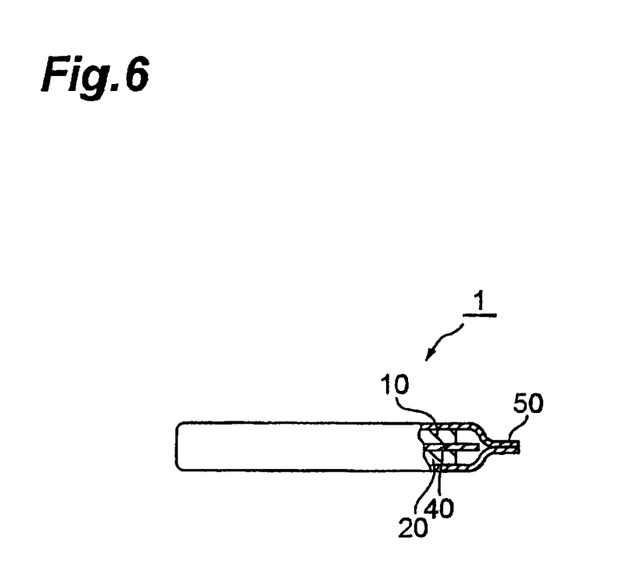
FIG. 6 is a schematic cross-sectional view that shows the principal part of the electrochemical device shown in FIG. 2 taken along the line Y-Y in FIG. 2.

FIG. 2 is a front view that shows a preferred embodiment of the electrochemical device of the present invention (lithium-ion secondary battery). FIG. 3 is a developed view that shows the interior of the electrochemical device shown in FIG. 2 as seen from the normal direction of the surface of the anode 10. FIG. 4 is a schematic cross-sectional view that shows the electrochemical device shown in FIG. 2 taken along the line X1-X1 in FIG. 2. FIG. 5 is a schematic cross-sectional view that shows the principal part of the electrochemical device shown in FIG. 2 taken along the line X2-X2 in FIG. 2. FIG. 6 is a schematic cross-sectional view that shows the principal part of the electrochemical device shown in FIG. 2 taken along the line Y-Y in FIG. 2.

As shown in FIGS. 2 to 6, the electrochemical device 1 is essentially composed of a planar anode 10 and a planar cathode 20 that face each other; a planar separator 40 arranged between the anode 10 and the cathode 20; a lithium ion-containing electrolytic solution (a non-aqueous electrolytic solution in the embodiment); a case 50 accommodating them in a sealed state; an anode lead 12 of which one end is electrically connected with the anode 10 and the other projects from the case 50 to the outside; and a cathode lead 22 of which one end is electrically connected with the cathode 20 and the other projects from the case 50 to the outside.

In reference to FIGS. 2 to 8, each component of the embodiment will now be described in detail.

Figure 7:
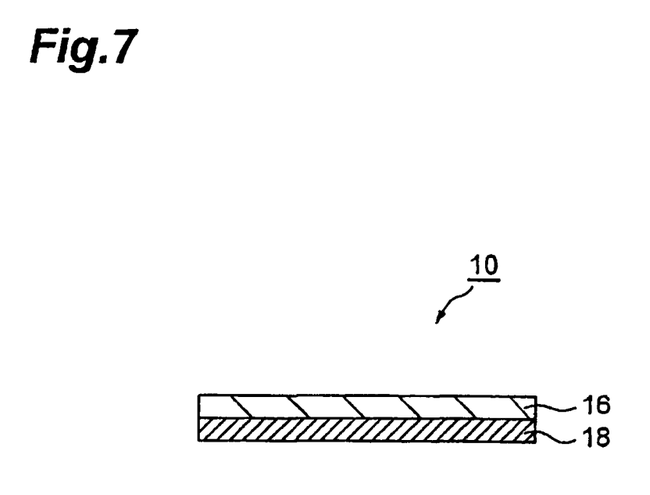
FIG. 7 is a schematic cross-sectional view that shows an example of a basic structure of the anode of the electrochemical device shown in FIG. 2.
Figure 8:
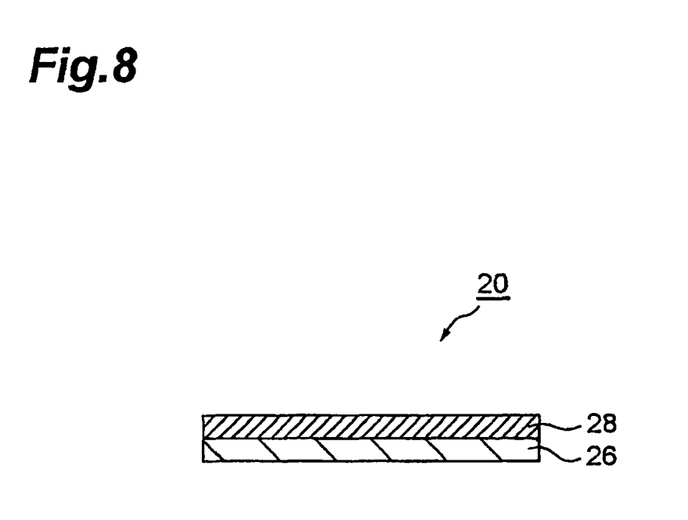
FIG. 8 is a schematic cross-sectional view that shows one example of a basic structure of the cathode of the electrochemical device shown in FIG. 2.

The anode 10 and the cathode 20 are first described. FIG. 7 is a schematic cross-sectional view that shows one example of a basic structure of the anode 10 of the electrochemical device shown in FIG. 2. FIG. 8 is a schematic cross-sectional view that shows one example of a basic structure of the cathode 20 of the electrochemical device shown in FIG. 2.

The anode 10 shown in FIG. 7 includes a current collector 16 and a layer 18 that contains an anode active material formed on the collector 16. As shown in FIG. 8, the cathode 20 includes a current collector 26 and a layer 28 that contains a cathode active material formed on the collector 26.

At least one of the layer 18 containing an anode active material and the layer 28 containing a cathode active material contains the composite particle 8 for electrode of the embodiment as described above as the active material. The composite particle 8 for electrode of the embodiment, which effectively acts as a cathode active material, is typically contained in the layer 28 containing a cathode active material.

The current collectors 16 and 26 may be any conductor that can achieve sufficient charge transfer to the layer 18 that contains an anode active material and the layer 28 that contains a cathode active material, and include the well-known current collectors used for electrochemical devices. For example, the collectors 16 and 26 include metal foils such as copper foils and aluminum foils.

The layer 18 that contains an anode active material for the anode 10 is essentially composed of an anode active material and a binder. Preferably, the layer 18 that contains an anode active material further includes a conducting aid.

Any anode active material that can reversibly occlude and release lithium ions or deintercalate and intercalate lithium ions can be used, and thus well-known anode active materials can be used. Such active materials includes carbonaceous materials such as natural graphite, artificial graphite, hard-graphitizing carbon, graphitizing carbon, low temperature calcined carbon, metals that can be combined with lithium, such as Al, Si, and Sn, noncrystalline compounds that are essentially composed of oxides, such as $SiO_2$ and $SnO_2$, and lithium titanate ($Li_4Ti_5O_{12}$). Among them, carbonaceous materials are preferred, and those materials that have an interlayer distance ($d_{002}$) of from 0.335 nm to 0.338 nm, and crystallite size ($Lc_{002}$) of from 30 nm to 120 nm are more preferred. Such carbon materials that meet these requirements include artificial graphite, MCF (mesocarbon fiber), MCMB (mesocarbon microbead). The interlayer distance ($d_{002}$) and crystallite size ($Lc_{002}$) can be determined by X-ray diffractometry.

Any well-known binder can be used in anodes without restriction, for example, fluorinated resins such as polyvinylidene fluoride (PVDE), polytetrafluoroethylene (PTFE), tetrafluoroethylene-hexafluoropropylene copolymers (FEP), tetrafluoroethylene-perfluoroalkylvinylether copolymers (PFA), ethylene-tetrafluoroethylene copolymers (ETFE), polychlorotrifluoroethylene (PCTFE), ethylene-chlorotrifluoroethylene copolymers (ECTFE), and polyvinylfluoride (PVE). Such binders not only bond particulate active materials and optional components, such as conducting aids, to each other, but also contribute to bonding of these components to current collectors.

In addition to the materials described above, binders may include vinylidenefluoride-related fluorinated rubbers such as vinylidenefluoride-hexafluoropropylene rubber (VDF-HFP rubber), vinylidenefluoride-hexatluoropropylene-tetrafluoroethylene rubber (VDF-HFP-TFE rubber), vinylidenefluoride-pentafluoropropylene rubber (VDF-PFP rubber), vinylidenefluoride-pentafluoropropylene-tetrafluoroethylene rubber (VDF-PFP-TFE rubber), vinylidenefluoride-perfluoromethylvinylether-tetrafluoroethylene rubber (VDF-PEMVE-TFE rubber), and vinylidenefluoride-chlorotrifluoroethylene rubber (VDF-CTFE rubber).

Besides those materials, examples of binders may include polyethylene, polypropylene, polyethylene terephthalate, aromatic polyamide, cellulose, styrene-butadiene rubber, isoprene rubber, butadiene rubber, and ethylene-propylene rubber. Also, thermoplastic elastomeric polymers such as styrene-butadiene-styrene block copolymer and its hydrogen additive, styrene-ethylene-butadiene-styrene copolymer, and styrene-isoprene-styrene block copolymer and its hydrogen additive may be used. Furthermore, syndiotactic 1,2-polybutadiene, ethylene-vinyl acetate copolymer, and propylene-alpha-olefin (carbon number of from 2 to 12) copolymer may be also used. In addition, conductive polymers may be also used.

As the conducting aid added if necessary, any of the well-known conducting aids can be used. Examples of the conducting aid includes carbon blacks, carbonaceous materials, metal powders such as copper, nickel, stainless steel, and iron, mixtures of carbonaceous materials and metal powder, and conductive oxides such as ITO.

Like the layer 18 that contains an anode active material, the layer 28 that contains a cathode active material for the cathode 20 is essentially composed of a cathode active material and a binder. Preferably, the layer 28 that contains a cathode active material further includes a conducting aid. In addition, the layer 28 includes the composite particle 8 for electrode of the embodiment described above as the cathode active material.

Also, the layer 28 may further contain any well-known cathode active material other than the composite particle 8 for electrode of the embodiment. Any cathode active material that can reversibly occlude and release lithium ions or deintercalate and intercalate lithium ions can be used, and thus the well-known active materials can be used. For example, metal oxide composites such as lithium cobaltate ($LiCoO_2$), lithium nickelate ($LiNiO_2$), lithium manganese spinel ($LiMn_2O_4$), and metal oxide composites represented by general formula: $LiNi_xCo_yMn_zO_2$ (x+y+z=1), lithium vanadium compound ($LiV_2O_5$), oivine type $LiMPO_4$ (wherein M represents Co, Ni, Mn, or Fe), and lithium titanate ($Li_4Ti_5O_{12}$).

The binder used for the cathode 20 may be similar to that used for the anode 10. The conducting aid used for the cathode 20, as necessary may be similar to that used for the anode 10.

In the layer 28 that contains a cathode active material, the carbon content is preferably from 2% to 20% by mass based on the total amount of the layer 28, more preferably from 2% to 15% by mass, and most preferably from 2% to 10% by mass, When the layer 28 has a carbon content of less than 2% by mass, the layer tends to have insufficient electron conductivity. On the other hand, when the layer 28 has a carbon content of 20% by mass, an undue amount of carbon is contained in the electrode, thereby reducing the proportion of the active material to lead to reduction in electrode capacity.

In the layer 28 that contains a cathode active material, the content of the composite particle 8 for electrode of the embodiment is preferably from 75% to 97% by mass based on the total amount of the layer 28, more preferably from 80% to 95% by mass, and most preferably from 85% to 95% by mass. A composite particle content of less than 75% by mass tends to reduce the electric capacity of the electrode. On the other hand, a composite particle content of more than 97% by mass in which the carbon content in the electrode is low tends to reduce the electron conductivity.

The current collector in the cathode 20 is electrically connected with one end of a cathode lead 22 made of, for example, aluminum, and the other end of the cathode lead 22 projects from the case 50 to the outside. On the other hand, the current collector in the anode 10 is electrically connected with one end of an anode lead 12 made of, for example, copper or nickel, and the other end of the anode lead 12 projects from the case 50 to the outside.

The separator 40 arranged between the anode 10 and the cathode 20 may be any separator that is made of a porous material having ion permeability and electronic insulating properties, and any well-known separator used for electrochemical devices can be used. Examples of such a separator 40 includes laminated films made of polyethylene, polypropylene, or polyolefin, stretched films made of mixtures of these polymers, or non-woven fiber fabrics made of at least one component selected from the group consisting of cellulose, polyester, and polypropylene.

The void in the case 50 is filled with an electrolytic solution (not shown), and part of the solution is contained within the anode 10, the cathode 20, and the separator 40. Examples of the electrolytic solution include non-aqueous electrolytic solutions that dissolve lithium salts in organic solvents. Examples of the lithium salts include salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$. These salts may be used alone or in combination. The electrolytic solution may be in a form of gel by addition of polymer.

The organic solvent may be any well-known solvent used in electrochemical devices. For example, cyclic carbonates, linear carbonates, lactones, and esters can be used alone or in combination. More specifically, the solvent preferably includes propylene carbonate, ethylene carbonate, and diethyl carbonate. These solvents may be used alone or in combination at any proportion.

The case 50 may be a metal can made of aluminum or stainless steel, or a metal foil of aluminum or stainless steel laminated with a resin film.

The shape of the electrochemical device of the present invention is not limited to those described above, and may be cylindrical, for example.

In the embodiment, not only the mother particle contained in the particulate core 4 but also the microparticles 3 contained in the electron-conducting layer 6 act as an active material. Therefore, even a composite particle 8 for electrode comprising the mother particle with a conventional ion diffusion capability can have an enhanced ion diffusion capability as a whole, as compared to a conventional composite of an active material with carbon.

In addition, the carbonaceous electron-conducting layer 6 coated on at least part of the surface of the particulate core 4 including the mother particle enhances the electron conductivity of the composite particle 8 for electrode as a whole.

Also, the microparticles 3 having a particle size of 300 nm or less contained in the electron-conducting layer 6 can enhance the discharge capacity particularly at high discharge rates.

An electrochemical device including a composite particle for electrode in the electrode in which the electrode active material contained in the mother particle 4 or microparticles 3 is lithium-containing phosphate or silicate salt can have further improved discharge capacities and rate characteristics.

An electrochemical device including the composite particle 8 for electrode as an active material in the electrode can have enhanced discharge capacities and rate characteristics.

One preferred embodiment of the electrochemical device of the present invention has been described in detail, but the present invention is not limited to the embodiment. For example, in the description of the embodiment, the sealing part of the electrochemical device 1 may be folded, thereby making the structure of the device into more compact. In the description of the embodiment, the electrochemical device 1 provided with one anode 10 and one cathode 20 has been described, but the device may has a structure that is provided with two or more anodes 10 and cathodes 20 each, and a separators 40 between the anode 10 and the cathode 20.

In the description of the embodiment, lithium ion secondary batteries has mainly been described as examples of electrochemical devices of the present invention, but examples of the devices may include secondary batteries other than lithium ion secondary batteries, such as metallic lithium secondary batteries (in which an electrode including a composite particle of the present invention is used for the cathode, and metallic lithium is used for the anode), or electrochemical capacitors such as lithium capacitors. The electrochemical device of the present invention can be used in power sources for power self-propelled micromachines or IC cards, and distributed power sources mounted on or within printed boards. The electrochemical devices other than lithium ion secondary batteries may have any active material that is suitable for each electrochemical device, other than the composite particle of the present invention.

The present invention will now be described in detail by means of Examples and Comparative Examples, but is not limited to the following Examples.

Example 1

$Li_2CO_3$ as a Li source, $V_2O_5$ as a V source, and $NH_4H_2PO_4$ as a $PO_4$ source were mixed in a stoichiometric ratio of $LiVOPO_4$, and calcined at 600° C. for 12 hours to obtain a mother particle 4 (particulate $LiVOPO_4$ with average particle size of 3.5 μm).

In a fluidized bed in which an air stream is generated, 95 parts by mass of the mother particle, and 5 parts by mass of ketjen black as particulate carbon (average particle size 30 nm) were fed, and these particles were mixed for 3 minutes. This yielded a composite particle 8 for electrode in which an electron-conducting layer 6 including microparticles 3 and carbon is formed on at least part of the surface of the particulate core 4 composed of one mother particle. The resulting composite particle 8 for electrode had an electron-conducting layer 6 of a thickness of 300 nm.

The resulting composite particle for electrode (97 parts by mass), and polyvinylidene fluoride (PVDF) as a binder (3 parts by mass) were then mixed, and dispersed in N-methyl-2-pyrrolidone (NMP) to prepare a slurry for forming a layer containing an active material. This slurry was coated on aluminum foil being a collector, dried, and rolled by pressure to obtain an electrode including an active material-containing layer of a thickness of 40 μm on the collector of a thickness of 20 μm, The active material-containing layer had a carbon content of 5% by mass based on the total amount of the active material-containing layer.

Between the resulting electrode and its counterpart Li foil (thickness 100 μm), a separator composed of a microporous polyethylene film was sandwiched to obtain a laminate. This laminate was placed in an aluminum laminator pack that was filled with a 1M LiPF$_6$ solution (solvent: EC/DEC=3/7 (mass ratio)) as an electrolytic solution, and the pack was vacuum-sealed to prepare a cell for evaluation (length 48 mm, width 34 mm, and thickness 2 mm).

For a cell for evaluation, a constant current discharge test was performed to determine discharge voltage and discharge capacity at discharge rates of 1/20 C and 1 C respectively at a discharging temperature of 25° C. Table 1 shows the results.

EXAMPLES 2-7

Each composite particle for electrode and each cell for evaluation in Examples 2-7 were prepared in the same manner as in Example 1, except that each particle size of the mother particle and microparticles 3 is shown in Table 1. The discharge voltage and discharge capacity were then determined. Table 1 shows the results.

Example 8

A composite particle for electrode and a cell for evaluation in Examples 8 were prepared in the same manner as in Example 1, except that particulate LiNiMnCoO$_2$ having a particle size of 3.5 μm was used as a mother particle 4 and microparticles 3 had a particle size of 300 nm. The discharge voltage and discharge capacity were then determined in the same manner as in Example 1. Table 1 shows the results.

Comparative Example 1

A composite particle for electrode and a cell for evaluation in Comparative example 1 were prepared in the same manner as in Example 1, except that microparticles 3 had a particle size of 500 nm. The discharge voltage and discharge capacity were then determined in the same manner as in Example 1. Table 1 shows the results.

Comparative Example 2

In contrast to Examples 1-7, the composite particle 8 for electrode was not used as the electrode active material in Comparative Example 2. Instead, in Comparative Example 2, the same active material (LiVOPO$_4$), conductive carbon, and binder as those in Example 1 were kneaded to obtain slurry. The resulting slurry was coated on the aluminum foil to form an electrode. A cell for evaluation in Comparative Example 2 was prepared using this electrode in the same manner as in Example 1. The discharge voltage and discharge capacity were then determined in the same manner as in Example 1. Table 1 shows the results.

Comparative Example 3

In contrast to Example 8, the composite particle 8 for electrode was not used as the electrode active material in Comparative Example 3. Instead, in Comparative Example 3, the same active material (LiNiMnCoO$_2$), conductive carbon, and binder as those in Example 8 were kneaded to obtain slurry. The resulting slurry was coated on the aluminum foil to form an electrode. A cell for evaluation in Comparative Example 3 was prepared using this electrode in the same manner as in Example 8. The discharge voltage and discharge capacity were then determined in the same manner as in Example 8. Table 1 shows the results.

[Table 1]

TABLE 1

|  | Composition of Active Material in Mother Particle | Particle Size of Particulate Core (μm) | Composition of Active material in Microparticles | Particle Size of Microparticles (nm) | Discharge Rate: 1/20 C | | Discharge Rate: 1 C | |
|---|---|---|---|---|---|---|---|---|
|  |  |  |  |  | Discharge Capacity (mAh/g) | Discharge Voltage (V) | Discharge Capacity (mAh/g) | Discharge Voltage (V) |
| Example 1 | LiVOPO$_4$ | 3.5 | LiVOPO$_4$ | 100 | 118 | 3.82 | 106 | 3.73 |
| Example 2 | LiVOPO$_4$ | 3.5 | LiVOPO$_4$ | 300 | 125 | 3.84 | 81 | 3.56 |
| Example 3 | LiVOPO$_4$ | 1 | LiVOPO$_4$ | 300 | 118 | 3.83 | 106 | 3.73 |
| Example 4 | LiVOPO$_4$ | 10 | LiVOPO$_4$ | 300 | 121 | 3.84 | 65 | 3.56 |
| Example 5 | LiVOPO$_4$ | 0.5 | LiVOPO$_4$ | 300 | 108 | 3.73 | 83 | 3.55 |
| Example 6 | LiVOPO$_4$ | 0.4 | LiVOPO$_4$ | 300 | 108 | 3.73 | 83 | 3.55 |
| Example 7 | LiVOPO$_4$ | 12 | LiVOPO$_4$ | 300 | 121 | 3.84 | 65 | 3.56 |
| Comparative Example 1 | LiVOPO$_4$ | 3.5 | LiVOPO$_4$ | 500 | 121 | 3.84 | 45 | 3.56 |
| Comparative Example 2 | LiVOPO$_4$ | 3.5 | No microparticles, No electron-conducting layer | — | 88 | 3.84 | 30 | 3.6 |
| Example 8 | LiNiMnCoO$_2$ | 3.5 | LiNiMnCoO$_2$ | 300 | 166 | 3.81 | 153 | 3.7 |
| Comparative Example 3 | LiNiMnCoO$_2$ | 3.5 | No microparticles, No electron-conducting layer | — | 166 | 3.81 | 149 | 3.7 |

When the composition of the active material was LiVOPO$_4$, the discharge capacity at 1 C is higher in Examples 1-7 in which the microparticles 3 have a particle size of 300 nm or less, as compared to Comparative Example 1 in which the microparticles 3 have a particle size of 500 nm.

When the composition of the active material was LiVOPO$_4$, the discharge capacity at 1/20 C and 1 C is higher in Examples 1-7 in which the active material-containing layer in the electrode includes the composite particle 8 for electrode, as compared to Comparative Example 2 in which the active material-containing layer does not include the composite particle 8 for electrode.

When the composition of the active material is LiNiMnCoO$_2$, the discharge capacity at 1 C is higher in Example 8 in which the active material-containing layer in the electrode includes the composite particle 8 for electrode, as compared to Comparative Example 3 in which the active material-containing layer does not include the composite particle 8 for electrode.

When Examples 1-7 and Comparative Examples 1 and 2 where the composition of the active material is LiVOPO$_4$ are compared with Example 8 and Comparative example 3 where the composition of the active material is LiNiMnCoO$_2$, the presence of the composite particle for electrode in the active material-containing layer contributes to a significantly higher effect on improvement of the discharge capacity in Examples 1-7 using a phosphate salt for the particulate core 4 and the microparticles 3, as compared to Example 8 using no phosphate salt for the particulate core 4 and the microparticles 3.

What is claimed is:

1. A composite particle for a cathode, the composite particle comprising:
   a particulate core including at least one mother particle containing LiVOPO$_4$; and
   an electron-conducting layer which covers at least part of a surface of said particulate core,
   wherein:
   said electron-conducting layer includes carbon and microparticles containing LiVOPO$_4$,
   said microparticles have a particle size of 100 nm or less, 0.4 μm≤a particle size of the particulate core≤12 μm, and
   the composite particle is a cathode active material for the cathode.

2. The composite particle according to claim 1, wherein the composite particle has a coverage (L'/L) of 0.2 or more, where:
   L' represents a length of the electronic conducting layer formed on a circumference of the particulate core, and
   L represents a length of the circumference of the particulate core.

3. The composite particle according to claim 1, wherein the composite particle has a BET specific surface area of from 1.5 m$^2$/g to 15.0 m$^2$/g.

4. The composite particle for electrode according to claim 1, wherein the electron conducting layer has an average thickness of from 10 to 500 nm.

5. An electrochemical device comprising:
   a cathode comprising a composite particle, the composite particle comprising:
   a particulate core including at least one mother particle containing LiVOPO$_4$; and
   an electron-conducting layer which covers at least part of a surface of said particulate core,
   wherein:
   said electron-conducting layer includes carbon and microparticles containing LiVOPO$_4$,
   said microparticles have a particle size of 100 nm or less, 0.4 μm≤a particle size of the particulate core≤12 μm, and
   the composite particle is a cathode active material for the cathode.

6. The electrochemical device according to claim 5, wherein the composite particle has a coverage (L'/L) of 0.2 or more, where:
   L' represents a length of the electronic conducting layer formed on a circumference of the particulate core, and
   L represents a length of the circumference of the particulate core.

7. The electrochemical device according to claim 5, wherein the composite particle has a BET specific surface area of from 1.5 m$^2$/g to 15.0 m$^2$/g.

8. The electrochemical device according to claim 5, wherein the electron conducting layer has an average thickness of from 10 to 500 nm.

* * * * *